July 1, 1969 O. R. WILLIAMS ET AL 3,452,575
VEHICLE FRAME AND BODY STRAIGHTENING TOOL
Filed July 10, 1967
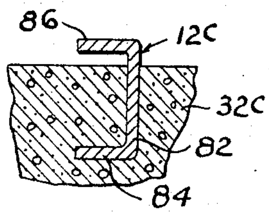
FIG. 7
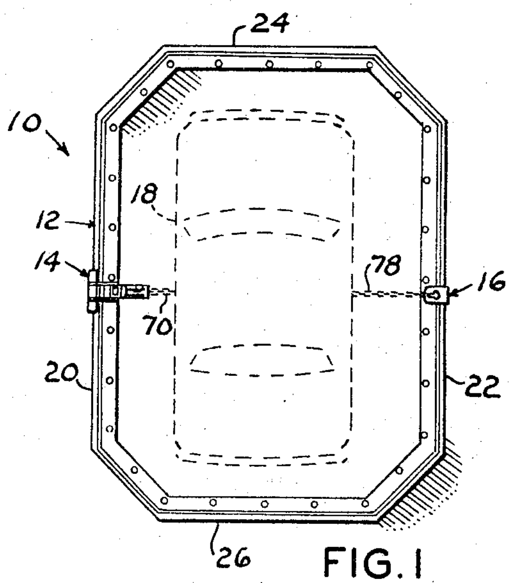
FIG. 1
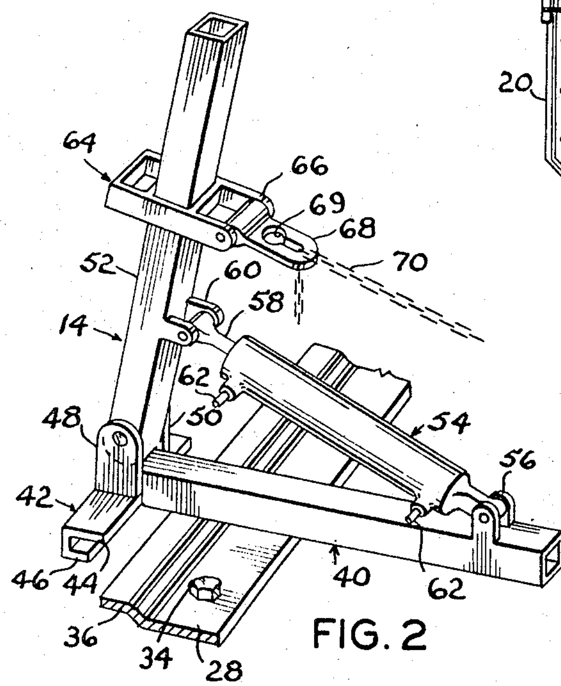
FIG. 2
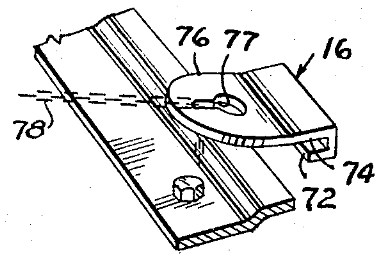
FIG. 3
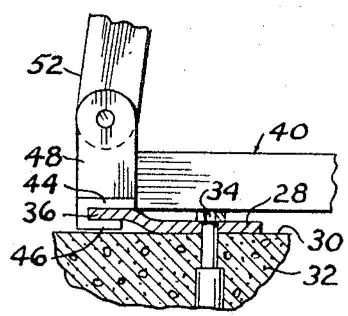
FIG. 4
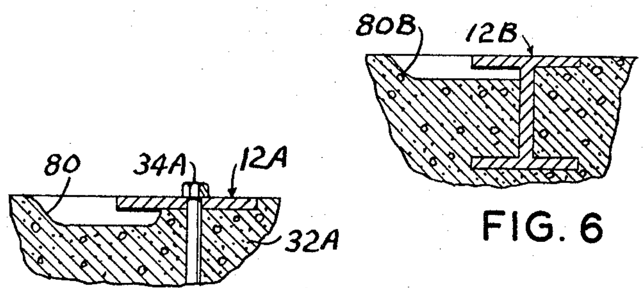
FIG. 5
FIG. 6
ORVILLE R. WILLIAMS
FLOYD D. WILLIAMS
INVENTORS.
BY
Robert K. Rhea
AGENT United States Patent Office 3,452,575

Patented July 1, 1969

3,452,575
VEHICLE FRAME AND BODY STRAIGHTENING TOOL

Orville R. Williams and Floyd D. Williams, Yukon, Okla., assignors of one-third to Jack C. Vian, Yukon, Okla.

Filed July 10, 1967, Ser. No. 652,117
Int. Cl. B21j *13/00;* B21d *11/00*
U.S. Cl. 72—302 5 Claims

ABSTRACT OF THE DISCLOSURE

A vehicle surrounding horizontal base plate is flatly secured to a floor surface. A pulling unit comprising a horizontal support and an upstanding pivoting lever is slidably connected with the base plate and projects toward a vehicle to be straightened. A pressure operated cylinder is connected with the support and the lever intermediate its ends. A clevis member, slidably received by the lever outwardly of its connection with the pressure cylinder, is connected to a portion of the vehicle to be straightened by a flexible member while a clamp element engaging the plate opposite the pulling unit anchors the vehicle.

BACKGROUND OF THE INVENTION

Repairs to vehicles damaged as the result of collisions is rendered difficult by the inability to conveniently apply a force to the damaged body or frame to force the damaged parts toward their original position. In many instances the damage to the vehicle includes a substantial part of the vehicle, such as a door, quarter panel or deck, as well as frame members. Each individual repair job usually requires consideration for the particular damaged member during a straightening operation. It is, therefore, desirable that a means be provided for attachment with and exerting a force on various damaged parts of a vehicle while simultaneously maintaining the mass of the vehicle in a stationary position to utilize the applied force more efficiently.

The prior art discloses a plurality of vehicle repair or straightening tools of the stationary and portable type, such as is disclosed by Patents Nos. 2,717,020, 2,979,102 and 3,149,659. The stationary type straightening tool usually involves many components and is therefore too expensive for the small shop owner whereas the portable type, such as shown by Patent 2,979,102, are inadequate for major repair work for the reason that the device cannot be attached and pressure applied at the required location. Other prior patents, such as Nos. 2,725,917 and 3,088,513, are directed toward a specific body or panel straightening function and are not adaptable for straightening heavier vehicle components such as a frame. Applicants' device, on the other hand, provides a base frame surrounding the vehicle and a pressure cylinder operated pulling means supported by the base frame adjacent any peripheral portion of the vehicle. The vehicle is maintained stationary with respect to the base frame by a connection between the vehicle and the base frame opposite the pulling means.

SUMMARY OF THE INVENTION

An elongated base plate forming a polygonal shaped frame is flatly connected to or partially imbedded within a concrete floor in surrounding relation with respect to a vehicle to be straightened. The base plate includes an outer flanged edge. An elongated support, provided with a U-shaped socket at one end portion, slidably engages the flanged edge of the base plate and projects horizontally across the floor toward the vehicle to be straightened.

An upstanding lever is pivotally connected at its depending end to the end portion of the support overlying the base plate. A pressure operated cylinder extends between and is connected with the inwardly extending portion of the support member and the lever intermediate the ends of the latter. A bracket member, slidably received by the lever outwardly of its connection with the pressure cylinder, is in turn connected with the vehicle by a flexible member. The side of the vehicle opposite the straightening means is anchored to the base plate by a clamp element engaged with the flanged edge of the base plate and a similar flexible member attached to the vehicle. Thus the vehicle is held stationary with respect to the base plate while the pulling means and clamp element may be selectively positioned along the base plate and connected with any desired portion of the vehicle.

It is, therefore, the principal object of this invention to provide a vehicle straightening tool comprising a pulling means and anchor member formed of relatively few components which are capable of being positioned at any desired location around and connected with the damaged vehicle.

BRIEF DESCRIPTION OF THE DRAWINGS

FIGURE 1 is a top plan view of the device in operative position illustrating, by dotted lines, the relative position of a vehicle to be straightened;

FIGURE 2 is a perspective view of the device in exploded relation with respect to a fragment of the base frame;

FIGURE 3 is a similar view of the anchor portion of the device;

FIGURE 4 is a fragmentary elevational view, partially in section, illustrating the position of the pulling means when connected with one embodiment of the base frame; and FIGURES 5, 6 and 7 are vertical cross-sectional views illustrating alternative cross section design configurations of the base frame.

DESCRIPTION OF THE PREFERRED EMBODIMENTS

Like characters of reference designate like parts in those figures of the drawings in which they occur.

In the drawings:

The reference numeral 10 indicates the device, as a whole, comprising a base frame 12, a pulling means 14 and an anchor or clamp element 16. The base frame 12 is substantially polygonal in plan view and preferably of a size to completely surround a vehicle, indicated by the dotted lines 18, having portions to be straightened so that the frame presents parallel side members 20 and 22 on opposing sides of the vehicle and parallel end members 24 and 26 at the respective ends of the vehicle.

As shown in FIGURES 2, 3 and 4, the base frame 12 is formed by a plate, substantially rectangular in cross section, having one side edge portion 28 flatly contacting the upper surface 30 of a concrete floor, indicated at 32. The flat portion 28 of the frame is secured by bolts 34 to the concrete floor. The opposite or outer side edge portion of the frame is turned arcuately upward and outwardly, as at 36, in parallel spaced relation above the floor surface 30 for the purposes presently explained.

The pulling means 14 includes a generally horizontally disposed box-channel base or support member 40 which extends transversely of the base frame 12 toward the vehicle 18. The outwardly disposed end portion of the support member 40 has transversely secured thereto, adjacent its depending surface, a U-shaped member or socket 42 having its legs 44 and 46 projecting toward and cooperatingly over and underlapping the lip edge portion 36 of the base frame. A pair of upstanding plates 48 and 50 are connected to the outwardly disposed end of the support member 40 above the socket 42 for pivotally connecting the depending end portion of a box-channel lever 52.

A conventional pressure operated cylinder 54 has its body end portion connected by pivotal connection means 56 to the upper surface of the end portion of the support member 40 opposite the socket 42. The cylinder 54 also includes a piston rod portion 58 connected by similar pivotal connection means 60 to the adjacent side surface of the lever 52 intermediate its ends. The cylinder 54, as illustrated, is of the double action type connected by tubing 62 to a source of fluid pressure but can be interchanged with a similar pressure cylinder of the single acting type if desired.

A generally box-shaped bracket 64 surrounds the lever 52 outwardly of the pivotal connection means 60 and is slidably positioned therealong. The bracket 64 has a clevis-like portion 66 having a lateral extension or tongue 68 formed on its pin which is suitably apertured, as at 69, to adjustably receive and grip the end portion of a flexible element, such as a chain 70 by a selected one of its links. The other end of the chain 70 is attached to the portion of the vehicle 18 to be straightened by any suitable conventional means, not shown.

The anchor member 16 comprises a substantially U-shaped member having its legs 72 and 74 projecting toward the base frame 12 for cooperative reception of the base frame lip 36 therebetween. The upper leg 74, as viewed in FIG. 3, is extended and turned slightly upward away from the base 12 to provide a projection 76 which is suitably apertured, as at 77, for similarly receiving one end portion of a second flexible member preferably a length of chain 78. The other end of the chain 78 is secured by any suitable conventional means, not shown, to the vehicle 18 opposite the position of the chain 70.

FIGURE 5 illustrates an alternative base member 12A comprising a transversely flat member imbedded within a concrete floor 22A, so that its upper surface lies in the plane of the upper surface thereof, and is similarly secured by bolts 34A. The concrete floor 22A is dished out or removed to form a floor recess 80 underlying and laterally of the side surface of the frame 12A opposite the position of a surrounded vehicle so that the socket 42 may grip the exposed edge of the frame 12A.

Similarly the base frame 12B, illustrated by FIG. 6, comprises an I-beam or H-shaped member, in cross section, having one of its legs similarly exposed by a floor recess or socket 80B.

Alternatively the base frame may be of U-shape or C-shape in cross section, as at 12C, having the majority of its bight portion 82 and one of its legs 84 imbedded in a concrete floor 32C. The other leg portion 86 projects above the upper surface of the concrete floor and outwardly of the position of the vehicle surrounded by the base frame.

OPERATION

In operation the vehicle 18 is positioned within the base frame 12, as shown by FIG. 1. The pulling means 14 is positioned on the frame opposite a portion of the vehicle to be straightened. One end of the chain 70 is connected to the damaged portion of the vehicle and the other end of the chain attached to the bracket tongue 68 with the pressure cylinder in collapsed or retracted position so that the free end of the lever 52 is inclined toward the vehicle. The anchor member 16 is positioned opposite the damaged portion to be straightened on the other side of the vehicle 18 and engaged with the base frame 12. The chain 78 is attached to the vehicle and the anchor member 16. Fluid pressure applied to the cylinder 54 then moves the lever 52 outwardly in a direction away from the vehicle thus pulling out the damaged portion of the vehicle in a straightening action.

Obviously the pulling unit and anchor member 16 may be slid along or repositioned, respectively opposite each other, at any peripheral portion of the vehicle as desired.

Operation of the pulling unit and the anchor member for the alternative embodiments of the base member is identical to that described hereinabove for the base frame 12.

Obviously the invention is susceptible to some change or alteration without defeating its practicability, and we therefore do not wish to be confined to the preferred embodiment shown in the drawings and described herein, further than we are limited by the scope of the appended claims.

We claim:

1. An apparatus for straightening damaged vehicles, comprising: a base frame of polygonal form adapted to surround a vehicle and be secured flatly to the horizontal surface supporting the vehicle; a generally horizontally disposed support member extending transversely across one side of said frame; a U-shaped socket connected intermediate its ends to the depending surface of one end of said support member and perpendicular with respect to the longitudinal axis of the latter, the legs of said U-shaped socket releasably receiving the outwardly disposed edge surface of a side of said base frame therebetween; a pair of upstanding plates secured to opposing sides of said one end of said support member; a generally upright lever pivotally connected at its depending end portion between said plates; a pressure cylinder pivotally connected between said support member and the lower end portion of said lever below its midpoint; and a bracket surrounding, in adjustable sliding relation, the end portion of said lever outwardly of its connection with said cylinder.

2. Structure as specified in claim 1 in which said base frame is substantially rectangular in cross section; and bolts securing said base frame to the supporting surface.

3. Structure as specified in claim 2 in which the outer peripheral edge portion of said base frame is turned arcuately upward and is disposed in parallel spaced relation with respect to the supporting surface.

4. Structure as specified in claim 1 in which said base frame comprises a U-shaped channel member having its leg members projecting outward of the position of a vehicle to be straightened, one said leg member being disposed parallel with and above the plane of the supporting surface.

5. Structure as specified in claim 1 in which said base frame comprises an I-beam having horizontally disposed flanges connected by a vertical web and having its lowermost flange and a portion of its web imbedded within the material forming the supporting surface.

References Cited

UNITED STATES PATENTS

| | | | |
|---|---|---|---|
| 2,836,219 | 5/1958 | Pertner | 72—705 |
| 3,276,237 | 10/1966 | Transue | 72—392 |
| 3,292,410 | 12/1966 | Baldassano | 72—392 |
| 3,338,083 | 8/1967 | Eck | 72—392 |

RONALD D. GREFE, *Primary Examiner.*

U.S. Cl. X.R.

72—392, 447, 705